US008068010B2

(12) United States Patent  
Bauchot et al.

(10) Patent No.: US 8,068,010 B2  
(45) Date of Patent: Nov. 29, 2011

(54) CHIPLESS RFID TAG AND METHOD FOR COMMUNICATING WITH THE RFID TAG

(75) Inventors: Frederic Bauchot, Saint-Jeannet (FR); Jean-Yves Clement, Saint-Jeannet (FR); Gerard Marmigere, Drap (FR); Pierre Secondo, Tourrettes sur Loup (FR)

(73) Assignee: International Business Machines Corporation, Armonk, NY (US)

( * ) Notice: Subject to any disclaimer, the term of this patent is extended or adjusted under 35 U.S.C. 154(b) by 1092 days.

(21) Appl. No.: 11/845,849

(22) Filed: Aug. 28, 2007

(65) Prior Publication Data

US 2008/0084276 A1    Apr. 10, 2008

(30) Foreign Application Priority Data

Oct. 5, 2006    (EP) ..................... 06301015

(51) Int. Cl.  
*H04Q 5/22* (2006.01)  
*G08B 13/14* (2006.01)  
*G06F 17/00* (2006.01)  
*G06K 5/00* (2006.01)

(52) U.S. Cl. ................. 340/10.4; 340/10.41; 340/10.52; 340/10.6; 340/572.4; 340/572.3; 235/375; 235/382

(58) Field of Classification Search ........................ None  
See application file for complete search history.

(56) References Cited

U.S. PATENT DOCUMENTS

| 5,673,037 | A | * | 9/1997 | Cesar et al. | ................. 340/10.32 |
| 5,736,967 | A | * | 4/1998 | Kayser et al. | .................. 345/2.1 |
| 5,841,770 | A | * | 11/1998 | Snodgrass et al. | ............ 370/346 |
| 6,130,621 | A | * | 10/2000 | Weiss | ............................ 340/5.28 |
| 6,966,493 | B2 | | 11/2005 | Hartmann | |
| 6,997,388 | B2 | | 2/2006 | Yogev et al. | |
| 2002/0149480 | A1 | * | 10/2002 | Shanks et al. | .............. 340/572.1 |

* cited by examiner

*Primary Examiner* — Daniel Wu  
*Assistant Examiner* — Pameshanand Mahase  
(74) *Attorney, Agent, or Firm* — Schmeiser, Olsen & Watts; John Pivnichny (57) ABSTRACT

A radio frequency identification (RFID) tag and a method and system for communicating with the RFID tag. The RFID tag includes a first and second structure respectively holding first data and second data that is complementary to the first data. The RFID tag does not include a microchip. An electromagnetic radio frequency signal is transmitted from an interrogator to the RFID tag. The interrogator receives, from the RFID tag, a response signal including third data being the first data or a combination of the first data and the second data. The interrogator extracts the third data from the response signal. A default value equal to the combination of the first data and the second data is stored in the interrogator. If the interrogator determines that the third data is unequal/equal to the default value, then a screen of the interrogator displays that the RFID tag is enabled/not enabled.

20 Claims, 5 Drawing Sheets

CHIPLESS RFID TAG AND METHOD FOR COMMUNICATING WITH THE RFID TAG

FIELD OF THE INVENTION

The invention relates to a chipless RFID tag and to a method for communicating with the RFID tag.

BACKGROUND OF THE INVENTION

Modern technology has produced a number of useful electronic identification methods and devices. Most familiar are the ubiquitous barcodes and magnetic strips that, together with their readers, are widely employed by businesses and others to perform several identification functions. The main reason barcodes and magnetic strips are so widely used is that they are very cheap.

Barcodes and magnetic strips are limited, however, by the relatively small amount of data they can encode and the effective range at which they can be read, which is quite short. Magnetic strips, for example, generally have such a limited range that the reader must be in direct contact with the strip in order to decode the data thereon. In the very few cases that a magnetic strip is read with a device other than a direct contact reader, the effective reading range is still only a few centimeters at best. Similarly, the effective range at which barcodes can be reliably read is typically not better than a few centimeters.

In addition to range limitations, both barcodes and magnetic strips are impossible to read if there is any obstruction between the reading device and the barcode or magnetic strip. When reading a magnetic strip or barcode, the orientation of the reading device relative to the barcode or magnetic strip also presents a problem. If the reading device is not properly aligned or is held at an incorrect angle, the encoded information cannot be read. As a result of these problems, each individual read operation requires manual scanning by a human operator if high read accuracy is needed. The attractive feature of barcodes and magnetic strips is that they are inexpensive. However, their inherent limitations have prevented their use in a wide range of applications for machine readable text where highly reliable and totally automated reading is required for read ranges of up to several meters.

The radio frequency identification (RFID) tag is another prior art type of identification device. When interrogated by a reading device which is also denoted as interrogator, RFID tags reflect or retransmit a radio frequency signal to return an encoded identification number to the interrogator. A good example of RFID tags is their usage in the collection of highway and bridge tolls. A RFID tag is positioned on a user's vehicle to respond to an interrogation signal when the vehicle passes through a toll collection point. A reading device connected to a computer processes the tag identification number and uses the decoded information to charge a toll to the user by deducting the amount due from the user's credit card or other account.

Prior art RFID tag devices are of two basic types; those that contain a microchip and those that do not. There is a radical difference in cost and performance between these two types; to such an extent, in fact, that they rarely compete with one another as to the appropriate type of use. As a general rule, chipped tags cost more but have a larger data capacity than chipless tags. Chipped tags, for example, are usually not available below a unit cost of about $1 each when ordered in a quantity of less than 1 million; whereas many chipless tags are projected to cost less than 20 cents each, even when manufactured in quantities of 100,000.

Most RFID tags will have a longer reliable range than magnetic strips and barcodes. As a rule, RFID tags can be interrogated without having a significant line of sight and orientation problems as are evidenced by barcodes and magnetic strips. Although chipped tags do have a longer range than magnetic strip and barcode systems, the range at which they can be reliably used is still a limiting factor.

Chipped tags are by far the most popular. A chipped tag consists of four elements or features: a computer microchip, circuits for converting radio signals to computer data signals and back to radio signals, an antenna, and a means for providing DC power to the chip circuitry. In low cost RFID chip tags, the first two features are often partially or totally integrated into a single microchip, which integration requires certain compromises in tag performance (read range, number of bits, etc). This combination of features also leads to certain integrated circuit (IC) cost and/or design compromises to accommodate both digital and radio frequency circuitry on a single IC. The impact of these design compromises can be partially compensated for by use of low radio frequency (RF) operating frequencies that, in turn, lead to rather large and expensive antennas.

The most daunting problem with chipped tags is the need for DC power for the chip circuitry. The combination of environmental issues coupled with severe constraints on costs, size and weight usually requires that the tag not have a battery or other onboard power source. The only generally useable solution is to obtain DC power by converting RF power received from the tag reader signal into DC power within the tag. Those skilled in the pertinent art term tags without a battery or other power source as passive tags, while those that contain a battery or other source are termed as active tags. The passive method of providing DC power to a chipped tag requires a more efficient tag antenna and higher transmitted power levels from the reader. It also requires added components which will either add to the cost of the microchip or to the cost of the tag for the required extra electrical components in the tag, which will also result in an increased tag size. The most important limitation of passive powered chip tags, however, is the severe restriction on the read range of the tag because a signal that is sufficiently strong to power the tag only extends a short distance from the tag reader antenna. Thus, while chipped tags have the dominant share of the RFID market, the high cost and limited read range combine to prevent chipped tags from replacing either barcodes or magnetic strips in any significant manner.

Chipless RFID tags do not contain a microchip but instead, rely on magnetic materials or transistorless thin film circuits to store data. A major advantage of chipless RFID tags is their relatively low cost.

Chipless RFID tags have the disadvantage that they can be read out by any interrogator that uses the appropriate RF-signals. There is therefore a need for a RFID tag which takes account of secrecy and privacy aspects.

SUMMARY OF THE INVENTION

The present invention provides a radio frequency identification (RFID) tag, comprising:
an antenna;
a first structure holding first data;
a second structure holding second data;
a first pair of strip lines electrically connecting the first structure to the antenna; and
a second pair of strip lines electrically connecting the second structure to the antenna,
wherein the second data is complementary to the first data, wherein the RFID tag does not comprise a microchip,
wherein the RFID tag is not enabled,
wherein the antenna is configured to receive an interrogation signal from an interrogator and to transmit the received interrogation signal simultaneously to the first and second structures via the first and second pair of strip lines, respectively,
wherein the interrogation signal is an electromagnetic radio frequency signal,
wherein the first structure is configured to modulate the interrogation signal received from the antenna with the first data to generate a first modulated signal and to transmit the first modulated signal to the antenna via the first pair of strip lines,
wherein the second structure is configured to modulate the interrogation signal received from the antenna with the second data to generate a second modulated signal and to transmit the second modulated signal to the antenna via the second pair of strip lines,
wherein the antenna is configured to combine the first and second modulated signals to generate a response signal comprising third data that is a combination of the first data and the second data and to transmit the response signal to the interrogator,
wherein the second pair of strip lines are configured to be burst open by a stimulus to disconnect the second structure from the antenna to enable the RFID tag, and
wherein if the antenna in the RFID tag after being enabled were to receive the interrogation signal from the interrogator, then the third data in the response signal generated from the received interrogation signal would comprise the first data and would not comprise the combination of the first data and the second data.

The present invention provides a method for communicating with a radio frequency identification (RFID) tag, wherein the RFID tag comprises a first structure holding first data and a second structure holding second data, wherein the second data is complementary to the first data, and wherein the RFID tag does not comprise a microchip, said method comprising:

transmitting an interrogation signal from an interrogator to the RFID tag, wherein the interrogation signal is an electromagnetic radio frequency signal;

after said transmitting the interrogation signal, receiving, by the interrogator from the RFID tag, a response signal comprising third data selected from the group consisting of the first data and a combination of the first data and the second data;

extracting, by the interrogator, the third data from the received response signal;

after said extracting, comparing, by the interrogator, the third data with a default value stored in the interrogator, wherein the default value consists of the combination of the first data and the second data;

if said comparing determines that the third data is unequal to the default value then displaying on a screen of the interrogator that the RFID tag is enabled;

if said comparing determines that the third data is equal to the default value then displaying on the screen of the interrogator that the RFID tag is not enabled.

DETAILED DESCRIPTION OF THE INVENTION

The present invention is directed to a RFID tag, a method, a computer program and to an interrogator.

In accordance with an embodiment of the invention, there is provided a RFID tag comprising an antenna, first means for storing first data, and second means for storing second data. The first means and the second means are electrically connected in parallel to the antenna and the second data is complementary to the first data.

The first storage means hold first data which is the data of interest and which is to be interrogated by use of a radio frequency signal via an interrogator. The first data can, e.g., correspond to an identifier or a code. However, as the second data is complementary to the first data and as both the first and the second storage means are connected to the antenna, the RFID tag responds with a signal that corresponds to the combination of the first and second data. Hence the RFID tag does not disclose the first data when interrogated as long as the second means are connected to the antenna. The RFID tag takes therefore account of privacy and security aspects as long as the first and second means are connected to the antenna.

In accordance with an embodiment of the invention, the second means comprise a predetermined breaking point, wherein the second means are electrically disconnectable from the antenna when the second means are burst open at the predetermined breaking point. The second means can be disconnected from the antenna. Once the second means have been disconnected from the antenna, only the first means are connected with the antenna. Hence, the first data can then be read out from the RFID tag. The RFID tag is enabled by disconnecting the second means from the antenna. The RFID tag in accordance with the invention provides therefore the advantage that is must be enabled before it can be read out. By interrogating such a tag, applications (e.g., business applications) are able to determine if the RFID tag is still disabled (when the RFID tag responds with the combination of the first and second data) or if the RFID tag is already enabled.

In accordance with an embodiment of the invention, the RFID tag responds with a combination of the first and second data when the RFID tag is interrogated by an interrogator if the breaking point is undamaged. The combination of the first and second data thereby corresponds, due to the first and second data being complementary to each other, to a default value. The first and second data are stored on the first and second means, respectively, in an encoded form. Thus, when interrogated, the combination of the encoded first and second data is received by the interrogator. The decoded first and second data correspond typically to binary data. Thus, the first data correspond to a sequence of "0" and "1". The second data correspond to the complement. For example, when the first data is equal to "01110", then the second data is equal to "10001". The default value corresponds then to "11111".

In accordance with an embodiment of the invention, the predetermined breaking point is damageable via an electric current flowing through the breaking point. The electrical current heats the breaking point until it melts. The usage of an electrical current to damage the breaking point provides the advantage that the electrical current can be generated easily at the breaking point, e.g., by an electromagnetic field which is absorbed by the antenna and guided to the breaking point where the electrical current is of sufficient strength to damage the breaking point. The use of an electromagnetic field for enabling the RFID tag provides an advantage that the RFID tag can be enabled in a contact-free manner.

In accordance with an embodiment of the invention, the breaking point is damaged by use of an electromagnetic field, wherein the magnetic field component of the electromagnetic field induces eddy currents in the breaking point, wherein the eddy currents heat the breaking point until it bursts open. An electromagnetic induction furnace can therefore be employed to burn the breaking point. Electromagnetic induction furnaces may be employed when a RFID-tag out of a plurality of RFID tags must be enabled. The one RFID-tag is then placed into the furnace whereas due to the shielding of the furnace, the other RFID tags of the plurality of RFID tags remain disabled. If an RF-wave would be used instead, all RFID tags would be enabled if said all RFID tags are in close proximity to each other as the RF-wave is not selective.

In accordance with an embodiment of the invention, the RDIF tag is enabled by application of a stimulus such as an electric field strength of an applied electromagnetic field, mechanical action on the RFID tag, a chemical process which causes the breaking point to break, by exposure to light, in particular by exposing the RFID tag to laser light. The RFID tag can for example be enabled by rubbing against the RFID tag; e.g., when the RFID tag is integrated in a sheet of paper, wherein the breaking point is damaged. This provides the advantage that the RFID tag can be integrated in everyday life products such as lottery tickets. People who use the lottery tickets are then able to enable the RFID tag (which might hold the winning number) simply by rubbing on the RFID tag. A particular device is not needed. Alternatively, the breaking point can also be designed in a way so that it melts or evaporates when exposed to laser light.

In accordance with an embodiment of the invention, the RFID tag is a chipless RFID tag. Plastic or conductive polymers might therefore be employed in order to store the first and complementary second data. The chipless RFID tag might also be a SAW RFID tag or a fiber based RFID tag. Alternatively, printed or bonded inductors, capacitors, diodes or plastic or silicon thin films might be employed for storing the first and second data.

Figure 1:
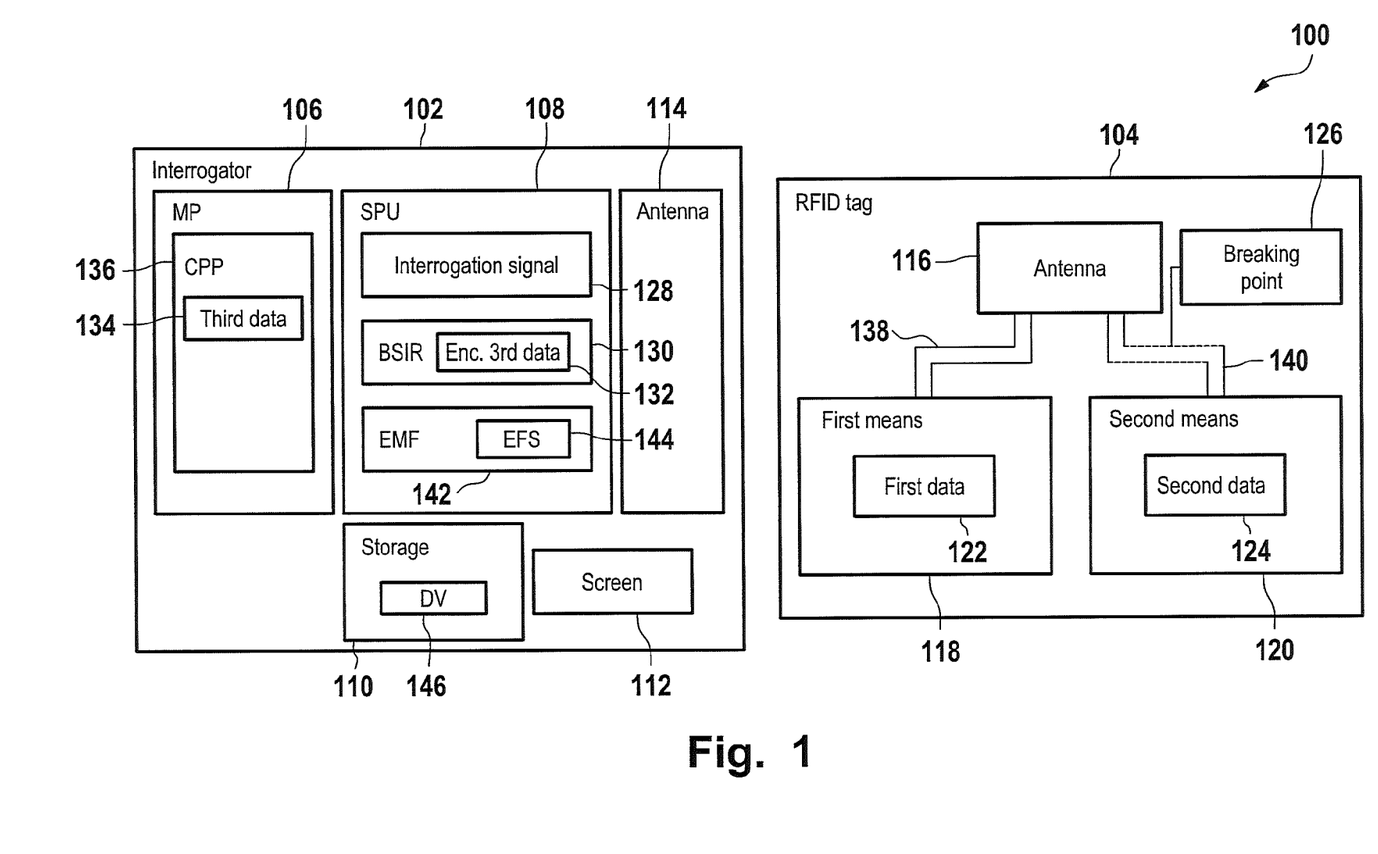
FIG. 1 shows a block diagram of a RFID system, in accordance with the present invention.

FIG. 1 shows a block diagram of a RFID system 100, in accordance with the present invention. The RFID system 100 comprises an interrogator 102 and a RFID tag 104. The interrogator 102 comprises a microprocessor 106, a signal processing unit 108, a storage device 110, a screen 112, and an antenna 114. The microprocessor 106 executes a computer program product 136 which is permanently stored on the storage device 110 and loaded into the microprocessor 106, for example, after the startup of the interrogator 102.

Figure 4:
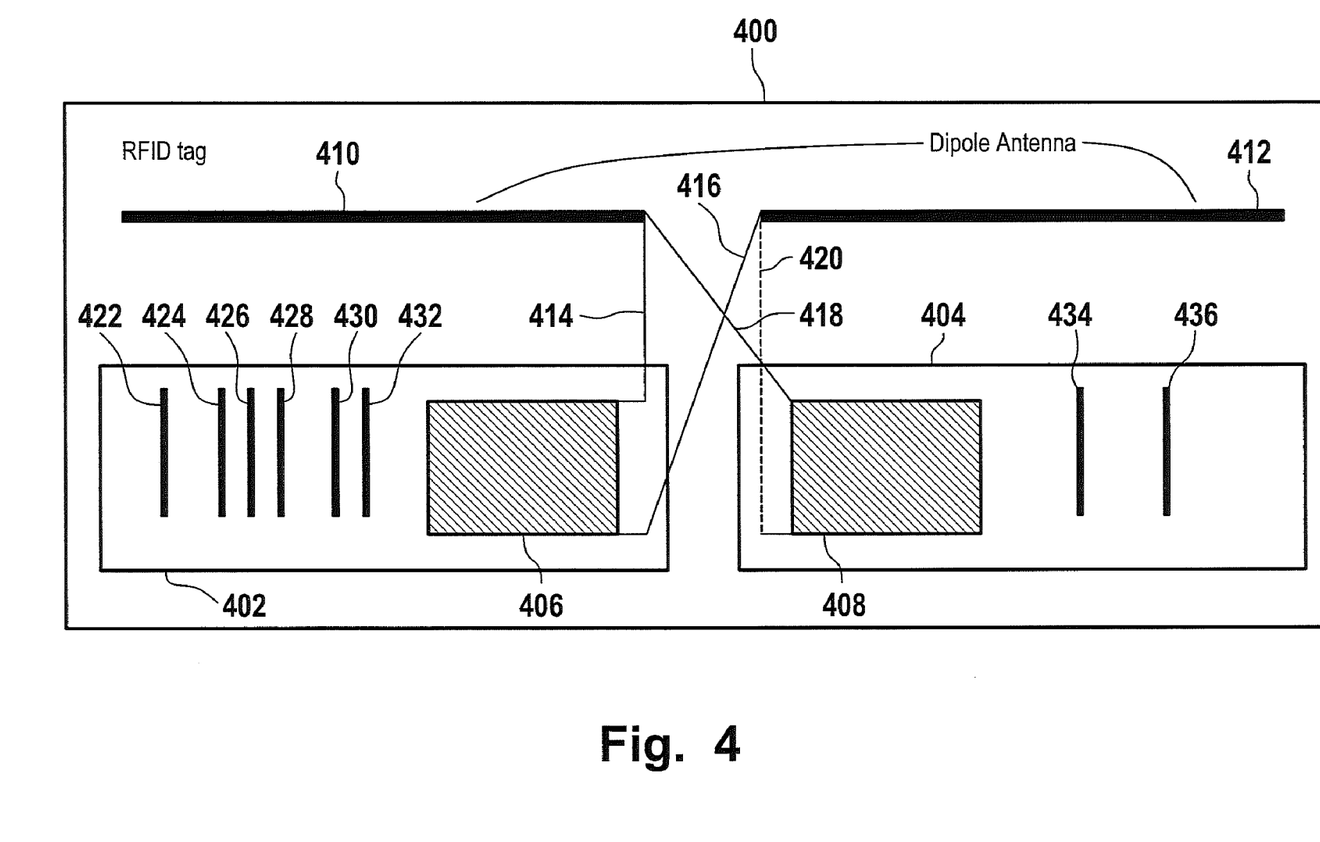
FIG. 4 shows a block diagram of a RFID tag, in accordance with the present invention.

The RFID tag 104 comprises an antenna 116, first means 118 which store first data 122 and second means 120 which store second data 124. The first means 118 may comprise a first structure and the second means 120 may comprise a second structure. For example, the first structure and the second structures may comprise the first substrate 402 and the second substrate 404, respectively, as depicted in FIG. 4 (described infra). The first data 122 and the second data 124 are complementary to each other. Electrical strip lines 138 connect the first means 118 to the antenna 116. Electrical strip lines 140 connect the second means 120 to the antenna 116. The strip lines 140 comprise at least one breaking point 126.

In order to read out the RFID tag 104, the signal processing unit 108 of the interrogator 102 generates an interrogation signal 128 which is an electromagnetic signal in the radio frequency range, which is adapted for reading out the RFID tag 104, and which is emitted by the antenna 114 so that the interrogation signal 128 irradiates the RFID tag 104. The antenna 116 of the RFID tag 104 receives the interrogation signal 128. The interrogation signal 128 travels down the strip lines 138 and is scattered back from the first means 118 so that the first data 122 are modulated on the interrogation signal 128 to generate a first modulated signal. The back reflected or back scattered interrogation signal 128 travels back through the strip lines 138 to the antenna 116.

Simultaneously, the interrogation signal 128 travels down the strip lines 140 and is scattered back from the second means 120, whereby second data 124 are modulated on the back scattered signal to generate a second modulated signal. The back scattered interrogation signal travels then back through the strip lines 140 to the antenna 116, whereby the back scattered interrogation signal 130 is a response signal that is generated by the superposition of the back scattered signal which arrives through the strip lines 138 (i.e., the first modulated signal) and the back scattered signal which arrives through the strip lines 140 (i.e., the second modulated signal) from the first and second means, respectively.

The back scattered interrogation signal 130 (i.e., the response signal) is emitted by the antenna 116 and received by the signal processing unit 108 after the back scattered signal has been detected by the antenna 114.

The back scattered interrogation signal 130 comprises encoded third data 132 which correspond to the combination of the first data 122 and the second data 124. The signal processing unit 108 extracts the encoded third data 132 from the back scattered interrogation signal 130. The computer program product 136 determines third data 134 by decoding the encoded third data 132. The combination of the first and second data 122 and 124 corresponds to a default value (DV) 146 as the first and second data are complementary to each other. The default value 146 is known to the interrogator as it is permanently stored on the storage device 110, where it is accessible for the microprocessor 106.

The computer program product 136 compares the third data 134 with the default value 146. If the third data 134 is equal to the default value 146, then the interrogator 102 has detected that the RFID tag 104 has not been enabled/activated before and has indeed responded to the interrogation signal 128 by providing the combination of the first and second data 122, 124. The interrogator 102 might then indicate to its user by use of the screen 112 that the RFID tag 104 has not yet been enabled and that the RFID tag 104 has responded with the default value 146.

As mentioned before, the strip lines 140 comprise the breaking point 126. The strip lines 138 consist of two strip lines which connect the antenna 116 with the first means 118. The strip lines 140 also consist of two strip lines that connect the antenna 116 with the second means 120. The breaking point 126 can be realized by using strip lines 140 which have an electrical resistance that is higher than the electrical resistance of the strip lines 138 (for example by using strip lines 138 and 140 which are made of the same material and which have the same length, but the strip lines 140 have a smaller width than the width of the strip lines 138).

When an electromagnetic field is applied to the strip lines 138 and 140, then an electric current is generated in the strip lines. As the electric resistance of the strip lines 140 is higher than the electric resistance of the strip lines 138, more electric energy is dissipated in the strip lines 140 than in the strip lines 138. Due to the dissipation of electric energy, the strip lines are heated. If the electrical field strength of the electromagnetic field is sufficiently high and if the electromagnetic field is applied sufficiently long, then the strip lines 140 are heated so that they melt and disconnect the second means 120 from the antenna 116. The strip lines 140 can for example be designed so that they burst open when the electric field strength of the electromagnetic field is larger than a first threshold value, whereby the strip lines 138 are designed to withstand easily the heating caused by such an electric field.

The signal processing unit 108 of the interrogator 102 is adapted to create an electromagnetic field (EMF) 142 whose electric field component has at least temporarily a field strength (EFS) 144 which is larger than the first threshold value. The electromagnetic field 142 is at about (i.e., approximately) the same radio frequency as the interrogation signal 128. The electromagnetic field 142 is emitted by the antenna 114 and received by the antenna 116 from where it is wandering down along the strip lines 138 and 140 to the first and second means 118 and 120.

As the electric field strength 144 of the electromagnetic field 142 is sufficiently large to burst open the strip lines 140 when the electromagnetic field is applied sufficiently long, the second means 120 become disconnected from the antenna 116. The RFID tag 104 has been enabled by burning or by bursting open the strip lines 140 at the breaking point 126.

When the interrogator 102 emits then the interrogation signal 128, the interrogation signal 128 is received by the antenna 116 and guided along the strip lines 138 to the first means 118. The interrogation signal scattered back carries the first data 122. As the strip lines 140 are broken, the interrogation signal 128 is scattered back from the broken point and cannot be scattered from the second means 120.

The back scattered interrogation signal 130 which is then received by the signal processing unit 108 comprises thus encoded third data 132 which corresponds to the first data 122. The computer program product 136 generates the third data 134 from the encoded third data 132 and compares the third data 134 with the default value 146. Since the third data 134 does not match the default value 146, the computer program product identifies the third data 134 as being indicative of the first data 122. The first data 122 can then be visualized to the user via the screen 112.

Figure 2:
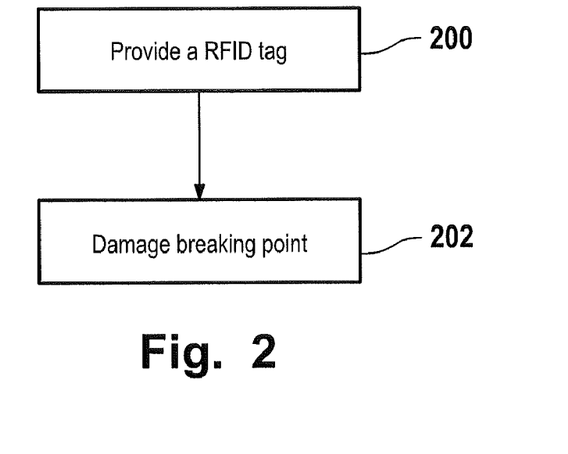
FIG. 2 shows a flow diagram illustrating basic steps performed by a method, in accordance with the present invention.

FIG. 2 shows a flow diagram illustrating basic steps performed by a method, in accordance with the present invention. In step 200 a RFID tag is provided. The RFID tag comprises an antenna, first means for storing first data and second means for storing second data. The second data are complementary to the first data. The first means and the second means are electrically connected in parallel to the antenna and the second means comprise a predetermined breaking point. In step 202, the RFID tag is enabled by damaging the predetermined breaking point, whereby the second means become disconnected from the antenna.

Figure 3:
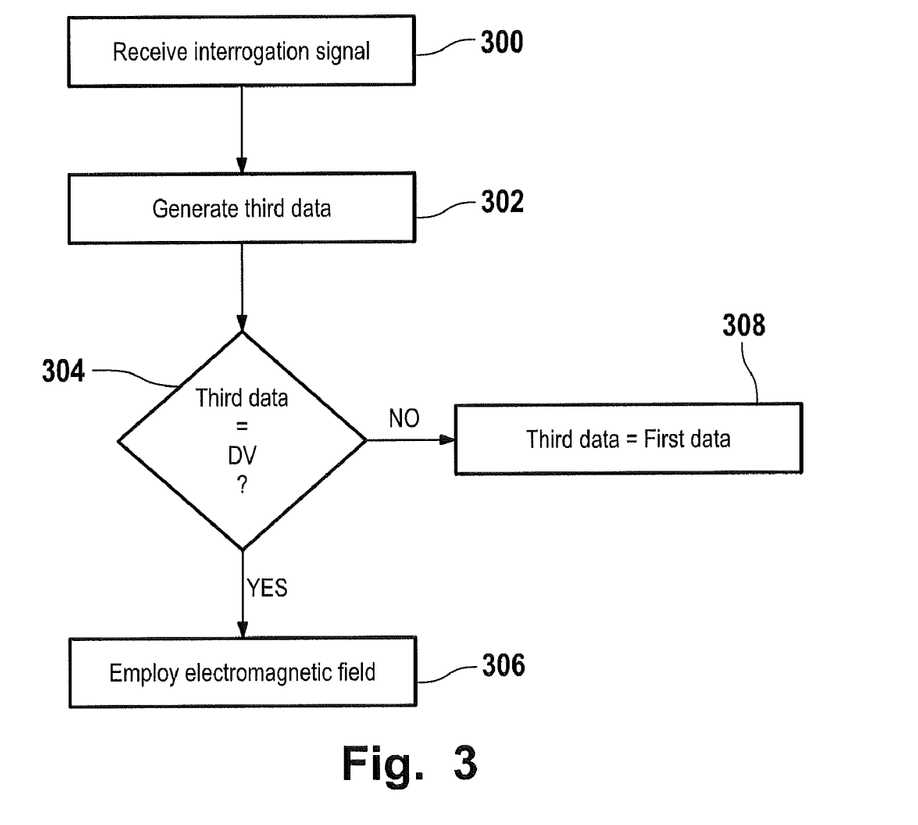
FIG. 3 shows a flow diagram illustrating basic steps performed by another method, in accordance with the present invention.

FIG. 3 shows a block diagram illustrating basic steps of a method, in accordance with the present invention. In step 300 an interrogation signal is received from a RFID tag. The interrogation signal has been scattered back from the RFID tag and comprises encoded third data which has been modulated on the interrogation signal by the RFID tag. In step 302 third data is generated by decoding the encoded third data. In step 304 the third data is compared with a default value. If the third data matches the default value, then the method in accordance with the invention proceeds with step 306, wherein an electromagnetic field is employed to burst open the predetermined breaking point. The electromagnetic field is adapted so that the electric field strength of the electromagnetic field is sufficiently strong to burst open the breaking point but still low enough in order not to harm any other components of the RFID tag. In contrast, if in step 304 the third data is found not to match the default value, then the method in accordance with the invention proceeds with step 308. The third data is then identified to be indicative of the first data that is stored on the RFID tag.

FIG. 4 shows a block diagram of a RFID tag 400, in accordance with the present invention. The RFID tag 400 is a so called surface acoustic wave (SAW) RFID tag. The RFID tag 400 has a first substrate 402 and a second substrate 404 with well known piezoelectric characteristics. Located at one end of the surface of the first substrate 402 is a first transducer 406. A second transducer 408 is located at one end of the surface of the second substrate 404.

The RFID tag 400 further comprises a dipole antenna having a first pole 410 and a second pole 412. A strip line 414 connects the first pole 410 of the antenna with the first transducer 406 which is connected via a strip line 416 to the second pole 412. A strip line 418 further connects the first pole 410 of the antenna with the second transducer 408 which is also connected via a strip line 420 to the second pole 412. The strip line 420 comprises a breaking point and can therefore be burst open by an electromagnetic field with a sufficiently high (electric) field strength, whereby the strip lines 414, 416, and 418 are not damaged by the electromagnetic field. The strip lines 414, 416, 418 are designed to withstand the electric field strengths used to burn the strip line 420.

An interrogation signal that is received by the dipole antenna travels down via the strip lines 414 and 416 or via the strip lines 418 and 420 to the first transducer 406 and to the second transducer 408, respectively. The first transducer 406 transforms the interrogation signal. A signal having a known frequency and amplitude is generated that travels down the surface of the substrate 402 as a surface acoustic wave (SAW). Located on the surface of the substrate 402 are reflectors 422, 424, 426, 428, 430, and 432. The reflectors 422, . . . , 432 are, e.g., made of single strips of conductive material. They are designed to reflect a portion of the surface acoustic wave back to the transducer 406. The reflectors 422, . . . , 432 are arranged to encode the reflected response with first data that can be decoded or demodulated. The transducer 406 generates a surface acoustic wave signal. The surface acoustic wave signal proceeds along the length of the substrate 402. When the surface acoustic wave signal encounters the reflector 432 then a portion of the signal is reflected back. The unreflected portion of the surface acoustic wave signal continues along the surface of the substrate 402 and generates additional reflected signals from all succeeding reflectors, whereby the complete modulated response corresponding to the first data is created. The first transducer 406 converts this complete modulated reflected response back to an electrical signal that is returned to the antenna.

Similarly, the second transducer 408 transforms the interrogation signal into a surface acoustic wave signal that travels down the substrate 404. The second substrate 404 comprises reflectors 434 and 436. The reflectors 434 and 436 are arranged complementary to the reflectors 422, . . . , 432. The reflectors 434 and 436 generate reflected signals from the surface acoustic wave signal, whereby the complete modulated response of the surface acoustic wave signal reflects second data encoded into the substrate 404 by means of the reflectors 434 and 436. The second transducer 408 converts the complete modulated reflected response back to an electrical signal that is returned to the antenna. The antenna emits the combination of the two modulated responses received from the first and second transducers.

When the strip line 420 is broken, the interrogation signal does not arrive at the second transducer 408. Hence no responses from the reflectors 434 and 436 are received. As a result, the antenna only emits the modulated signal received from the first substrate 402. Thus, only when the strip line 420 is broken the first data encoded via the reflectors 422, . . . , 432 at the substrate 402 can be read out from the RFID tag 400.

Figure 5:
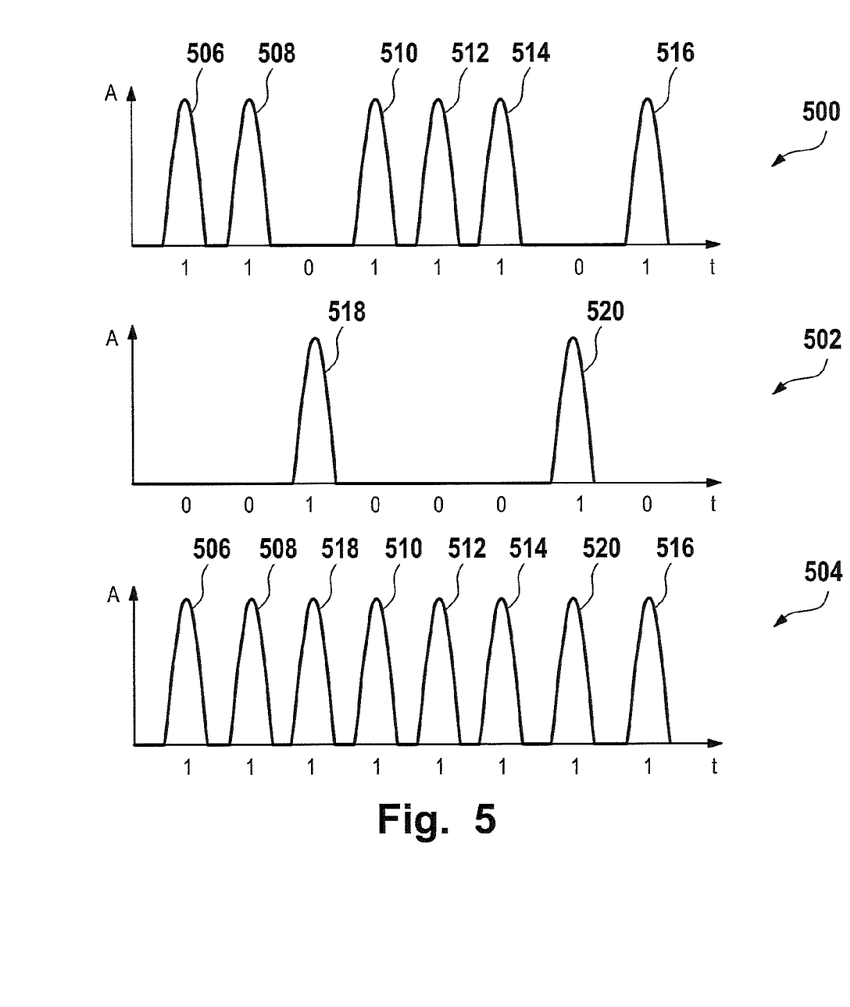
FIG. 5 shows schematically the first and second data as well as the combination of the first and second data, in accordance with the present invention.

FIG. 5 shows schematically the first and second data as well as the combination of the first and second data in form of the first modulated signal 500 received from the first transducer 406 by the antenna comprising the first pole 410 and the second pole 412, in form of a second modulated signal 502 received from the second transducer 408 at the antenna and in form of the signal 504 corresponding to the combination of the first and second modulated signals 500 and 502, in accordance with the present invention. The signals 500, 502, and 504 are shown as a function of time. The ordinate relates to the amplitude of the signals over time. As mentioned above, the surface acoustic wave travels down the substrate 402 and a portion is reflected from the reflector 432, another portion is later reflected by the reflector 430, and so on. At the antenna, a first peak 506 is received which is due to the back reflected portion from the reflector 432. Then, after a period of time, a second peak 508 is received which is due to the portion of the surface acoustic wave that has been reflected from the reflector 430. The period of time is a measure for the spacing between the reflectors 430 and 432. As the spacing between reflectors 428 and 430 is twice the spacing between the reflectors 430 and 432, a third peak 510 is received after twice the period of time has been spent with respect to the point in time when the peak 508 is received. Furthermore, the signal 500 comprises peaks 512, 514, and 516, whereby the separations in time of the peaks reflect the spacings between the reflectors 422 and 424 and between the reflectors 424 and 426.

The signal 502 comprises peaks 518 and 520. The separation in time of the peaks 518 and 520 reflects the spacing between the reflectors 434 and 436. As the reflectors 434 and 436 have been arranged complementary to the reflectors 422, . . . , 432, the peak 518 occurs in between the peaks 508 and 510 and the peak 520 occurs in between the peaks 514 and 516. The signal 504 which corresponds to a combination of the signals 502 and 504 is the signal that is emitted by the antenna. It consists of a sequence of equally spaced peaks 506, . . . , 520. Each peak corresponds to a logical '1' whereas a lack of a peak corresponds to a logical '0'. Hence, the signal 500 represents the numerical value '11011101', whereas the signal 502 represents the complement value '00100010'. The combination thereof corresponds to the numerical value '11111111'.

Once the strip line 420 is burst open, no signals are received anymore from the substrate 404. Hence, the signal 504 corresponds to the signal 500. Thus the interrogator receives either a sequence of '1' which is identified by the interrogator to reflect a numerical default value or a sequence of '1' and '0' that reflects the first data stored on the first substrate 402.

Figure 6:
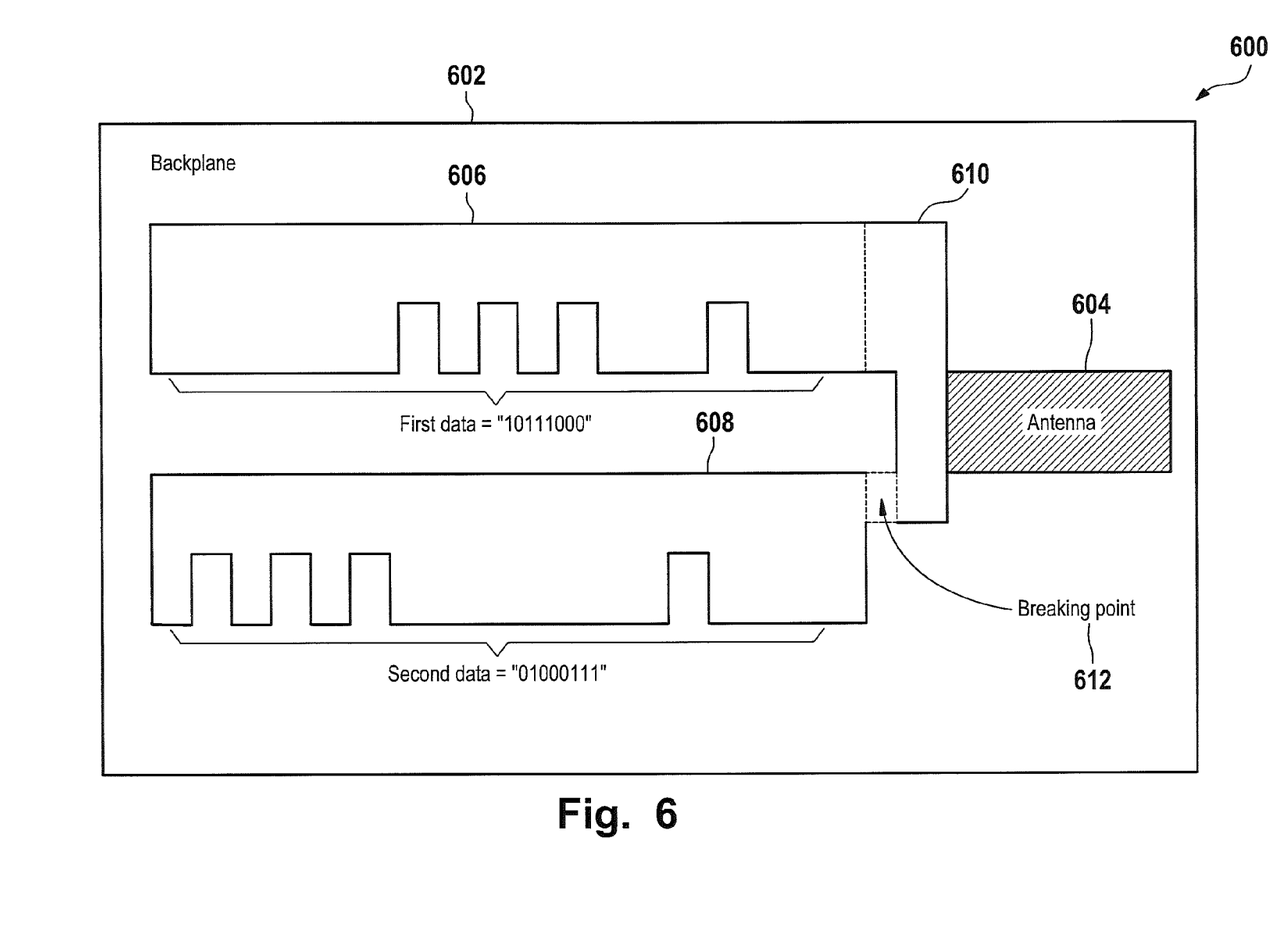
FIG. 6 shows schematically a layout of another RFID tag, in accordance with an embodiment of the present invention.

FIG. 6 shows schematically a layout of a RFID tag 600, in accordance with the present invention. The RFID tag 600 is incorporated into a backplane 602 which might be a sheet of paper or a sheet of Mylar. The RFID tag 600 comprises an antenna 604, a first metallic film 606, a second metallic film 608, and a bridge 610 that connects the first and second metallic films. The first and second films 606 and 608 as well as the bridge 610 are made of one piece of metallic film, e.g., by evaporating the metallic film on the backplane 602. The bridge 610 comprises a breaking point 612 at the link to the second metallic film 608. The first metallic film 606 holds first data corresponding to the numerical value '10111000'. Furthermore, the second metallic film 608 holds second data that is complementary to the first data and therefore corresponds to the numerical value '01000111'. The first and second data are "embossed" into the metallic films by an adaptation of the shape of the metallic films 606 and 608.

When the RFID tag 600 is interrogated, it responds with the combination of the first and second data which corresponds to the default value '11111111' as long as the breaking point 612 is not burnt or burst open by use of an electric field. In contrast, after the breaking point 612 has been burst open, the RFID tag 600 answers only with the first data when interrogated.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A radio frequency identification (RFID) tag, comprising:
   an antenna;
   a first structure holding first data;
   a second structure holding second data;
   a first pair of strip lines electrically connecting the first structure to the antenna; and
   a second pair of strip lines electrically connecting the second structure to the antenna,
   wherein the second data is complementary to the first data,
   wherein the RFID tag does not comprise a microchip,
   wherein the RFID tag is not enabled,
   wherein the antenna is configured to receive an interrogation signal from an interrogator and to transmit the received interrogation signal simultaneously to the first and second structures via the first and second pair of strip lines, respectively,
   wherein the interrogation signal is an electromagnetic radio frequency signal,
   wherein the first structure is configured to modulate the interrogation signal received from the antenna with the first data to generate a first modulated signal and to transmit the first modulated signal to the antenna via the first pair of strip lines,
   wherein the second structure is configured to modulate the interrogation signal received from the antenna with the second data to generate a second modulated signal and to transmit the second modulated signal to the antenna via the second pair of strip lines,
   wherein the antenna is configured to combine the first and second modulated signals to generate a response signal comprising third data that is a combination of the first data and the second data and to transmit the response signal to the interrogator,
   wherein the second pair of strip lines are configured to be burst open by a stimulus to disconnect the second structure from the antenna to enable the RFID tag, and
   wherein if the antenna in the RFID tag after being enabled were to receive the interrogation signal from the interrogator, then the third data in the response signal generated from the received interrogation signal would comprise the first data and would not comprise the combination of the first data and the second data.

2. The RFID tag of claim 1,
   wherein the first and second pair of strip lines are made of a same material;

wherein an electrical resistance of the second pair of strip lines exceeds an electrical resistance of the first pair of strip lines;

wherein the stimulus is an electromagnetic field;

wherein upon application of the electromagnetic field to the first and second pair of strip lines for a sufficient length of time such that an electric field strength of the electromagnetic field exceeds a specified first threshold value, the second pair of strip lines is configured to be burst open by being heated and melted by an electric current resulting from the electric field strength and the first pair of strip lines is configured to not be burst open.

3. The RFID tag of claim 1, wherein the first and second pair of strip lines each have a same length, and wherein a width of each strip line of the second pair of strip lines is less than a width of each strip line of the first pair of strip lines.

4. The RFID tag of claim 1, wherein the interrogation signal and the electromagnetic field are at about a same radio frequency.

5. The RFID tag of claim 1, wherein the stimulus is laser light, and wherein the laser light is configured to burst open the second pair of strip lines by melting or evaporating a portion of the second pair of strip lines.

6. The RFID tag of claim 1, wherein the stimulus is heating, chemical action, or mechanical action.

7. The RFID tag of claim 1, wherein each strip line of the second pair of strip lines is configured to be burst open by the stimulus.

8. The RFID tag of claim 1, wherein the antenna is a dipole antenna comprising a first pole and a second pole;

wherein the first structure comprises a first substrate, a first transducer at an end of the first substrate, and one or more conductive reflectors on the first substrate configured in a first spatial distribution that encodes the first data;

wherein the second structure comprises a second substrate, a second transducer at an end of the second substrate, and one or more conductive reflectors on the second substrate configured in a second spatial distribution that encodes the second data;

wherein the first pair of strip lines consist of a first strip line and a second strip line;

wherein the second pair of strip lines consist of a third strip line and a fourth strip line;

wherein the first strip line electrically connects the first transducer to the first pole;

wherein the second strip line electrically connects the first transducer to the second pole;

wherein the third strip line electrically connects the second transducer to the first pole;

wherein the fourth strip line electrically connects the second transducer to the second pole;

wherein the fourth strip line is configured to be burst open by the stimulus and the first, second, and third strip lines are not configured to be burst open by the stimulus;

wherein the first and second substrates each comprise piezoelectric characteristics;

wherein the antenna is configured to receive transmit the received interrogation signal simultaneously to the first and second transducers via the first and second pair of strip lines, respectively;

wherein the first transducer is configured to transform the interrogation signal into a first surface acoustic wave signal that travels on the first substrate and is reflected by the one or more conductive reflectors on the first substrate back to the first transducer in a timing pattern that generates the first modulated signal; and wherein the second transducer is configured to transform the interrogation signal into a second surface acoustic wave signal that travels on the second substrate and is reflected by the one or more conductive reflectors on the second substrate back to the second transducer in a timing pattern that generates the second modulated signal.

9. A method for communicating with a radio frequency identification (RFID) tag, wherein the RFID tag comprises a first structure holding first data and a second structure holding second data, wherein the second data is complementary to the first data, and wherein the RFID tag does not comprise a microchip, said method comprising:

transmitting an interrogation signal from an interrogator to the RFID tag, wherein the interrogation signal is an electromagnetic radio frequency signal;

after said transmitting the interrogation signal, receiving, by the interrogator from the RFID tag, a response signal comprising third data selected from the group consisting of the first data and a combination of the first data and the second data;

extracting, by the interrogator, the third data from the received response signal;

after said extracting, comparing, by the interrogator, the third data with a default value stored in the interrogator, wherein the default value consists of the combination of the first data and the second data;

if said comparing determines that the third data is unequal to the default value then displaying on a screen of the interrogator that the RFID tag is enabled;

if said comparing determines that the third data is equal to the default value then displaying on the screen of the interrogator that the RFID tag is not enabled.

10. The method of claim 9, wherein said comparing determines that the third data is unequal to the default value.

11. The method of claim 9, wherein said comparing determines that the third data is equal to the default value, and wherein the method further comprises:

responsive to said comparing having determined that the third data is equal to the default value, enabling the RFID tag.

12. The method of claim 11, wherein the RFID tag comprises an antenna and a first pair of strip lines electrically connecting the first structure to the antenna;

wherein prior to said enabling the RFID tag, the RFID tag comprises a second pair of strip lines electrically connecting the second structure to the antenna;

wherein said enabling the RFID tag comprises bursting open the second pair of strip lines by applying a stimulus to the RFID tag to disconnect the second structure from the antenna; and wherein if the antenna in the enabled RFID tag were to receive the interrogation signal from the interrogator then the third data in the response signal generated from the received interrogation signal would comprise the first data and not comprise the combination of the first data and the second data.

13. The method of claim 12, wherein an electrical resistance of the second pair of strip lines exceeds an electrical resistance of the first pair of strip lines; and wherein said applying the stimulus to the RFID tag comprises applying an electromagnetic field to the first and second pair of strip lines for a sufficient length of time such that an electric field strength of the electromagnetic field exceeds a specified first threshold value, resulting in the second pair of strip lines being burst open by being heated and melted by an electric current resulting from the electric field strength and the first pair of strip lines not being burst open.

14. The method of claim 13, wherein the method further comprises prior to said applying the electromagnetic field to the first and second pair of strip lines:
transmitting the electromagnetic field from the interrogator to the antenna of the RFID tag, wherein the antenna of the RFID tag is configured to receive the transmitted electromagnetic field and to propagate the received electromagnetic field simultaneously to the first and second pair of strip lines.

15. The method of claim 14, wherein the interrogation signal and the electromagnetic field are at about a same radio frequency.

16. The method of claim 12, wherein said applying the stimulus to the RFID tag comprises exposing the second pair of strip lines to laser light to melt or evaporate a portion of the second pair of strip lines to burst open the second pair of strip lines.

17. The method of claim 12, wherein said applying the stimulus to the RFID tag comprises applying heating, applying chemical action, or applying mechanical action to the second pair of strip lines to burst open the second pair of strip lines.

18. The method of claim 9, wherein the third data consists of a sequence of binary values, wherein if the RFID tag is not enabled then each binary value of the sequence of binary values is 1, and wherein if the RFID tag is enabled then the sequence of binary values comprises 0 and 1.

19. A computer usable storage medium having a computer readable program code embodied therein, said computer readable program code containing instructions that when executed by a processor implement the method of claim 9.

20. A system comprising a processor and a computer readable memory unit coupled to the processor, said memory unit containing instructions that when executed by the processor implement the method of claim 9, wherein the system comprises the interrogator, and wherein the interrogator comprises the processor and the memory unit.

* * * * *